United States Patent
Krishnamoorthy et al.

(10) Patent No.: US 9,043,881 B2
(45) Date of Patent: *May 26, 2015

(54) ENTITLED DATA CACHE MANAGEMENT

(71) Applicant: Thompson Reuters (Markets) LLC, New York, NY (US)

(72) Inventors: Venkatanarayanan Krishnamoorthy, New Providence, NJ (US); Srinivasan Varadrajan, Lawrenceville, NJ (US); Stephen Zucknovich, Wayne, NJ (US); Jacques Leisy, Bridgewater, NJ (US); Vladimir Jornitski, Courbevoie (FR)

(73) Assignee: Thompson Reuters (Markets) LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,604

(22) Filed: Feb. 8, 2013

(65) Prior Publication Data

US 2013/0152172 A1 Jun. 13, 2013

Related U.S. Application Data

(63) Continuation of application No. 12/582,180, filed on Oct. 20, 2009, now Pat. No. 8,397,066.

(51) Int. Cl.
*H04L 9/18* (2006.01)
*G06F 21/31* (2013.01)
*G06F 21/62* (2013.01)
*H04L 29/08* (2006.01)

(52) U.S. Cl.
CPC ............ *G06F 21/31* (2013.01); *G06F 21/6218* (2013.01); *G06F 2221/2141* (2013.01)

(58) Field of Classification Search
CPC . H04L 12/2821; H04L 63/105; G06F 3/0637; G06F 2221/2145; G06F 21/31; G06F 21/6218; G06F 2221/2141; G11B 20/00862; G11B 20/00731; H04N 7/162
See application file for complete search history.

(56) References Cited

U.S. PATENT DOCUMENTS

| 5,941,947 A | 8/1999 | Brown et al. |
| 7,600,230 B2 | 10/2009 | Desai et al. |
| 2005/0091213 A1 | 4/2005 | Schutz et al. |

(Continued)

FOREIGN PATENT DOCUMENTS

| JP | 2001-014209 A | 1/2001 |
| JP | 2007-128371 A | 5/2007 |

OTHER PUBLICATIONS

International Search Report dated Dec. 3, 2010.

(Continued)

*Primary Examiner* — Venkat Perungavoor
(74) *Attorney, Agent, or Firm* — Banner & Witcoff, Ltd (57) ABSTRACT

Systems and methods are disclosed for managing an entitled data cache. A data server may generate and send entitled data to a data cache server. The data cache server, a server that may be located nearer to the user within a data provider's computer network, may receive and cache the entitled data. A permission server may store user's permissions and transmit the user's permissions to the data server and the data cache server. Upon receiving a request for data, the data cache server may retrieve the requested data from the cache and send a subset of the cached data which matches the user's permissions to the user, without the need to request the data from the data server.

20 Claims, 8 Drawing Sheets

(56) References Cited

U.S. PATENT DOCUMENTS

| | | |
|---|---|---|
| 2005/0144482 A1 | 6/2005 | Anuszewski |
| 2005/0154915 A1 | 7/2005 | Peterson et al. |
| 2005/0268042 A1 | 12/2005 | Wall et al. |
| 2006/0143447 A1* | 6/2006 | Vasishth et al. ............... 713/166 |
| 2006/0212453 A1 | 9/2006 | Eshel et al. |
| 2007/0033191 A1 | 2/2007 | Hornkvist et al. |
| 2007/0124309 A1 | 5/2007 | Takase et al. |
| 2007/0226320 A1 | 9/2007 | Hager et al. |
| 2007/0245409 A1 | 10/2007 | Harris et al. |
| 2008/0115223 A1* | 5/2008 | Morris et al. ................... 726/27 |

OTHER PUBLICATIONS

First Chinese Office Action dated Jun. 5, 2014 in Application No. 2010-800522798.

Notice of Reasons for Rejection mailed May 29, 2014 in Japanese Application No. 2012-535262.

* cited by examiner

| Data ID | Cache Signature | Content | Data Permissions | Expiration |
|---|---|---|---|---|
| Fund.Est.Cons.Group1.IBM | 123 | Data Row 1 Content 1 | P1,P2,P3 | 1/1/2010 00:00 |
| Fund.Est.Cons.Group1.INTC | 456 | Data Row 2 Content 2 | P1 | 1/2/2010 00:00 |
| Fund.Est.Det.Group2.IBM | 789 | Data Row 3 Content 3 | P2 | 1/1/2010 00:00 |
| Fund.Est.Det.Group2.INTC | 135 | Data Row 4 Content 4 | P4 | 1/2/2010 00:00 |

FIGURE 5a

| User (Member of) or Group | User/Group Permissions | Entitlement Token |
|---|---|---|
| User 1 (Group A) | P1 | 1 |
| User 2 (Group B) | P2, P6 | 2 |
| User 3 (Groups A and C) | P2 | 1,3 |
| User 4 (No Group) | P3, P5 | |
| Group A | P1, P5 | 1 |
| Group B | P1, P2, P3 | 2 |
| Group C | P4, P5 | 3 |

ENTITLED DATA CACHE MANAGEMENT

CROSS-REFERENCE TO RELATED APPLICATIONS

The present application is a continuation of and claims priority to U.S. application Ser. No. 12/582,180, filed Oct. 20, 2009, and titled "ENTITLED DATA CACHE MANAGEMENT." The above-referenced application is incorporated by reference in its entirety.

FIELD

The present disclosure is directed to a computer-based system and method for the electronic storage and distribution of information, and more particularly, for the distribution of information to authorized recipients.

BACKGROUND

Global computer networks, such as the Internet, enable information to be distributed to a wide range of people at locations around the world. One of the advantages of the Internet is that the communication protocols used are non-proprietary, thus enabling end users to access and use the Internet without the need for customized hardware or software. Many different industries use computer networks as a way to provide their customers with quick access to vast amounts of data. In these businesses, the speed at which both secure and non-secure data is provided to remote users is of utmost importance and is often an area of distinctiveness for these businesses. One common technique to allow businesses to more quickly distribute data to users involves the use of proxy servers that reside closer on the network to the users requesting the data. By using a proxy server to cache the response to a user's first data request, subsequent identical data requests from the same user can be handled by the proxy server without the need to query a data server to retrieve the same information again.

However, the user of proxy servers for providing data to users may be unsuitable when data providers need robust control of access to the data. For example, financial data providers are required to comply with laws and regulations governing the distribution of financial data. Furthermore, financial information is quite valuable and financial data providers must have a means of preventing access from unauthorized and/or non-paying customers. Therefore, financial data providers, as well as data providers in other industries, may generate entitled data which is restricted to a subset of users. In many current systems, entitled data is requested from a data source and the data in transit is marked as non-cacheable to prevent unauthorized users from accessing cached data. For example, after a user requests and receives entitled data from a secure data provider, that user's permissions to access the secure data may be subsequently revoked. The non-cacheable data will not be cached at a proxy server, and subsequent data requests for the same data will need to be retrieved again from the data server.

However, in larger client-server systems providing entitled data to users, server capacity is more or less linearly related to the number of users on the system. Accordingly, for every request generated by a user or the addition of new user, the capacity of the servers required to generate and send the entitled data increases. The servers can only handle a fixed number of requests per time, so as the number of requests grow, the number of servers must increase, which greatly increases the expense for financial firms to generate and send entitled data. Accordingly, a need exists for additional methods and systems to provide access to entitled data.

BRIEF SUMMARY

The present invention, as more fully described below and shown in the figures, is related to a data management system for managing entitled data. Aspects of this invention are related to caching the entitled data on a data cache server to allow quicker access to and delivery of the data.

In at least one embodiment, a computer system, such as a data cache server that caches data close to the entry point of a provider's network is described. The ability to cache, or store the data, in a location close to the consumer may allow the number of user and the number of user requests to increase without increasing the number of data servers, which generate data. The location of a data cache server near the entry point of the provider's network decreases the time it takes to send data to the end user because the transfer of data to the data cache server is usually done prior to a user's request for data. Additionally, data cache servers are less expensive than data servers, and therefore decrease the expense to financial firms for generating and sending data to a user.

In at least one embodiment, a computer server is configured to receive entitled data from a data server and cache the received data. The entitled data may have associated data permissions corresponding to at least one user authorized to access the computer server. The computer server may cache the entitled data and store the entitled data and a related identifier corresponding to the associated data permissions of the entitled data. The computer server may retrieve user permission corresponding to a user and determine if the user's permissions intersect with the associated data permissions of the cached entitled data. If the user's permissions intersect with the associated data permissions of the cached entitled data, the computer server may send at least a subset of the cached entitled data to the user.

In at least one embodiment, a method of data cache management may include a computer system receiving a first data request corresponding to a first user having first user permissions. The computer system may determine if a first response data corresponding to the first data request and first user permission is stored in a local data cache. If the first response data is stored in the local cache, the first user may be sent the response data. A second data request corresponding to a second user having second user permissions may be received. The second user permissions may be different than the first user permissions. The computer system may determine if a second response data corresponding to the second user request and second user permissions is stored in a local data cache and if the second response data is stored in the local data cache, send the second user the second response data. The second response data may be different than the first response data.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

DETAILED DESCRIPTION

Figure 1:
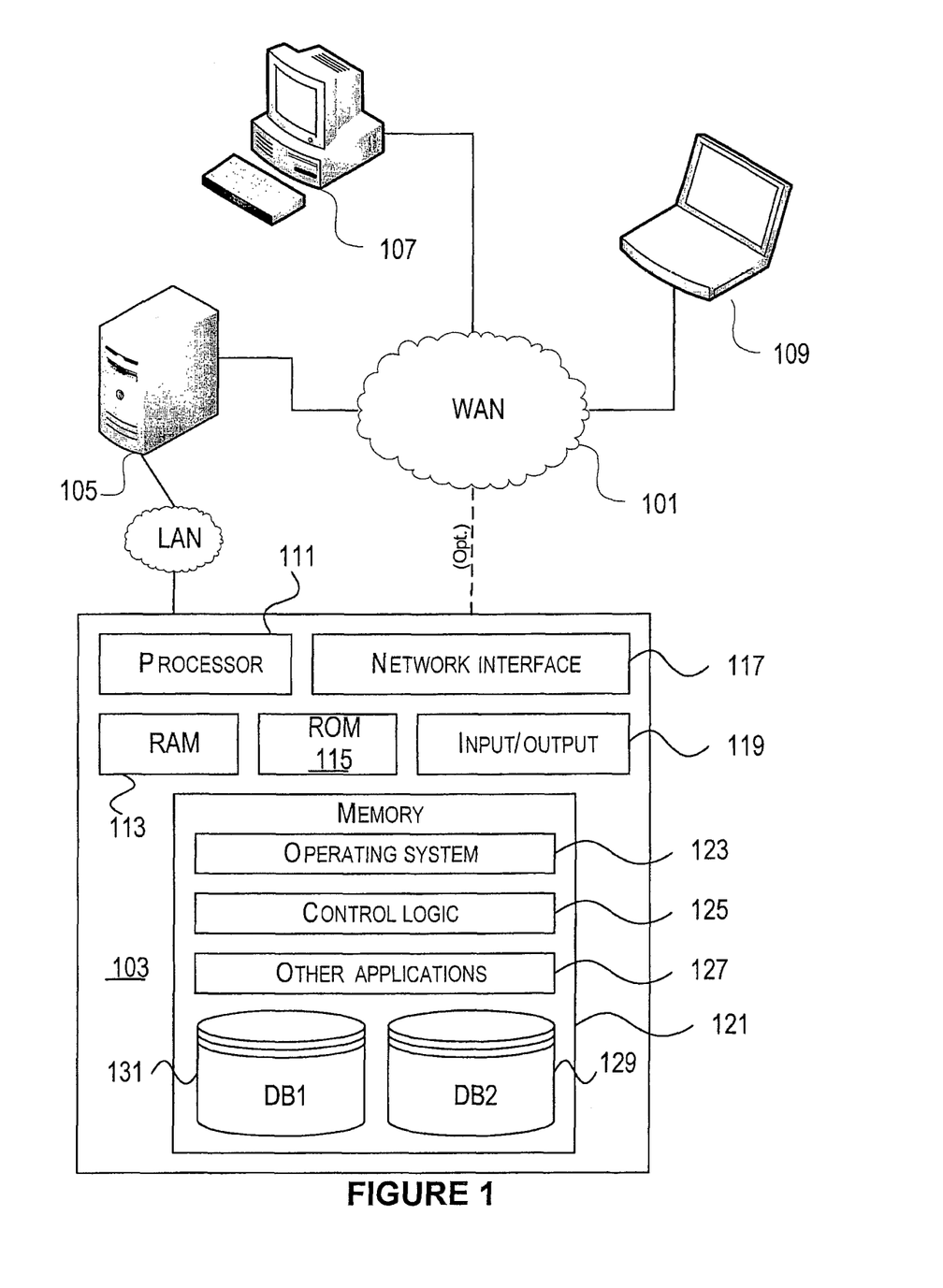
FIG. 1 is an illustrative embodiment of a network and data processing device utilized in the data cache management system, in accordance with certain embodiments of the present invention.

FIG. 1 illustrates one example of a network architecture and data processing device that may be used to implement one or more illustrative aspects of the invention. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include one or more data server 103, web server 105, and client computers 107, 109. Data server 103 provides overall access, control and administration of databases and control software for performing one or more illustrative aspects of the invention as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects of the invention as described herein, and other application software 127 providing secondary, support, and/or other functionality which may or may not be used in conjunction with aspects of the present invention. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the invention, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects of the invention may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 2:
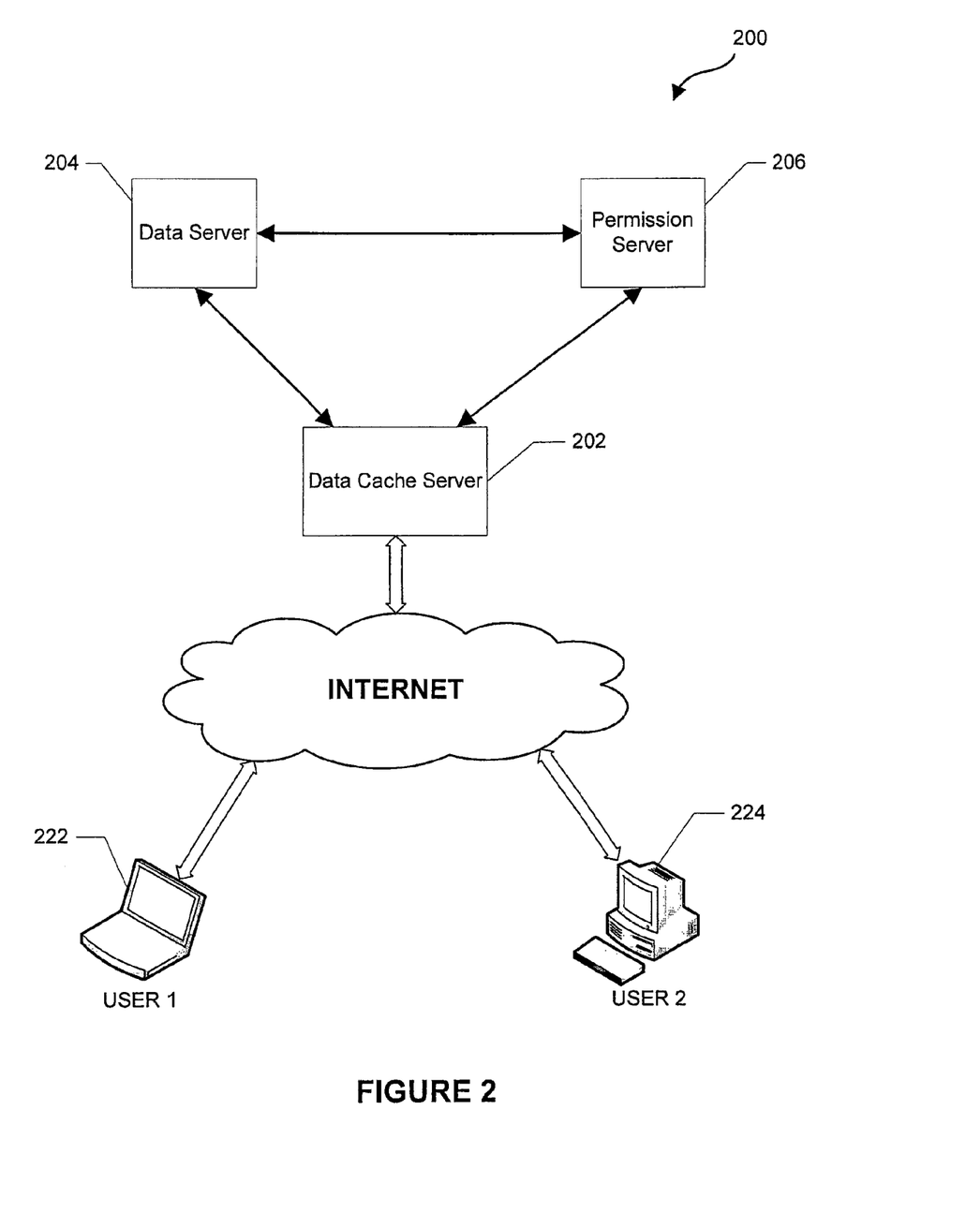
FIG. 2 is a component diagram for an illustrative entitled data cache management system, in accordance with certain embodiments of the present invention.

Referring to FIG. 2, an illustrative embodiment of a data management system 200 is shown. As shown in FIG. 2, the data management system 200 may include a data cache server 202, a data server 204, and a permission server 206. The data cache server 202 may be any type of computer server designed to store cached data for delivery to users, and may be separate from the data server 204. In one embodiment, the data cache server 202 may be an edge device that is located at the edge of the computer resources (e.g., computer network) for a data provider and may be the entry point for users into the data provider's network. By caching data at the edge of the computer resources, at a location closer to the user than the data server 204, time and cost savings may result from sending data to users from the data cache server 202 rather than requesting the data from a data server 204 each time a request is made. By removing the need to request and receive data from the data server 204, the delivery time of data to a user may be decreased. Furthermore, the load from numerous requests for data from the data server 204 may be reduced, potentially resulting in increased performance and system reliability.

As shown in FIG. 2, the data cache server 202 may communicate with a data server 204 that contains entitled data. Entitled data refers to data that is maintained securely so that access to certain entitled data may be restricted to certain users. In some examples, users may have associated sets of permissions (i.e., entitlements) which determine their access to different data in the system. For instance, users may be entitled to see an entire data set or only specific rows of data within the data set. Additionally, entitled data may require that a user's permissions be verified prior to sending the entitled data to the user. For example, the entitled data may include financial transaction data. In one example, each time a user requests data, the user's permissions must be verified with a permission server 206, prior to sending the entitled data to the user. In at least one embodiment, the data server 204 contains data that is both entitled and temporal. Temporal data refers to data that may change, or may have multiple different values over time. For instance, temporal data may be a company stock price that has different values at different times throughout the day, week, month, year, etc.

The permission server 206 may store user permissions for multiple different users and/or groups of users on the system, and may retrieve users permissions in response to a query from a data cache server 202 or a data server 204 identifying one or more users of the system. For example, a user may have permissions to view an entire data set, specific rows and/or columns of data sets only, or certain sections of a data set while not having permissions to view others. In another example, a user may belong to one or more groups, (e.g., customers, brokers, administrators) so that all users of the group may have permissions that allows the users to view specific data (e.g., stock data, customer data). When users send requests for data to the system, the user(s) identities may be determined from user identification and/or authentication information contained in the data requests. In one embodiment, the permission server 206 provides the user permissions to the data cache server 202. The permission server 206 may also communicate the user's permissions to the data server 204, and the data server 204 may send both the entitled data and the user permissions to the data cache server 202. In certain examples, the permission server 206 may be a separate device from the data server 204 and the data cache server 202. Alternatively, the permission server 206 may be physically located within a secure portion of either the data server 204 or the data cache server 202. In certain implementations, due to the secure nature of user permissions, it might not be desirable to transmit user or group permission data over a public network or another unsecure computer network. Therefore, secure computer networks and/or encryption may be used to transmit permission data to and from the permission server 206 and servers 202, 204. Additionally, other security measures may be implemented during the transmission of data, such as not transmitting a user's permissions in the same data transmission as the user's identity.

Figure 3:
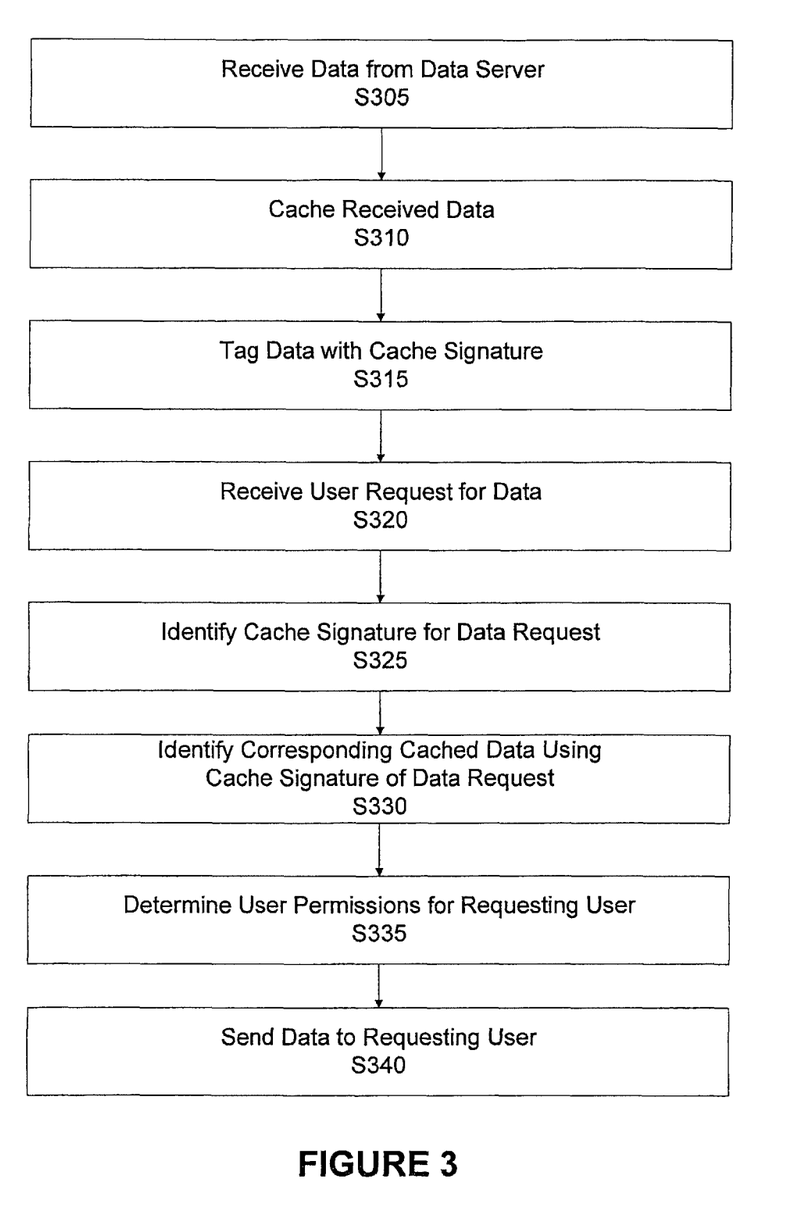
FIG. 3 is a flow diagram of an illustrative embodiment of entitled data cache management, in accordance with certain embodiments of the present invention.

Referring to the example FIG. 3, when the data cache server 202 receives data from the data server 204, as illustrated in S305, the data cache server 202 stores a copy of the data locally (i.e., caches the data) within the memory of the data cache server 202, as illustrated in S310. The data received from the data server 204 may contain a Data ID, which may be used to update the cached data without a user request. The Data ID may be generated by the data server 204. The data received from the data server 204 may also contain a list of user permissions or Entitlement Tokens that allow a user to access the data. Data cache server 202 may receive and cache a plurality of different data sets. In certain examples, the data cache server 202 may receive the data in response to an initial user request for the data. In other examples, the data may be sent to the data cache server 202 prior to any user request for the data. In a further example, the data may be sent to the data cache server 202 when a new version of the data arrives. In this example, the data may be sent to the data cache server 202 when the data server 204 is notified that data has changed. In this example, the data server 204 may notify the data cache server 202 of the changed data. In response, the data cache server 204 updates the copy of the corresponding cached data. This notification of changed data may use a previously supplied DataID.

Figure 5A:
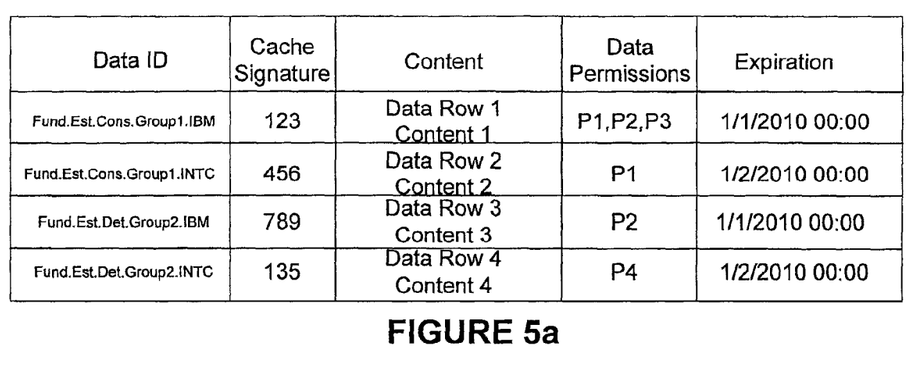
FIG. 5a is a table containing example data corresponding to data permissions in an illustrative data cache management system, in accordance with certain embodiments of the present invention.
Figure 5B:
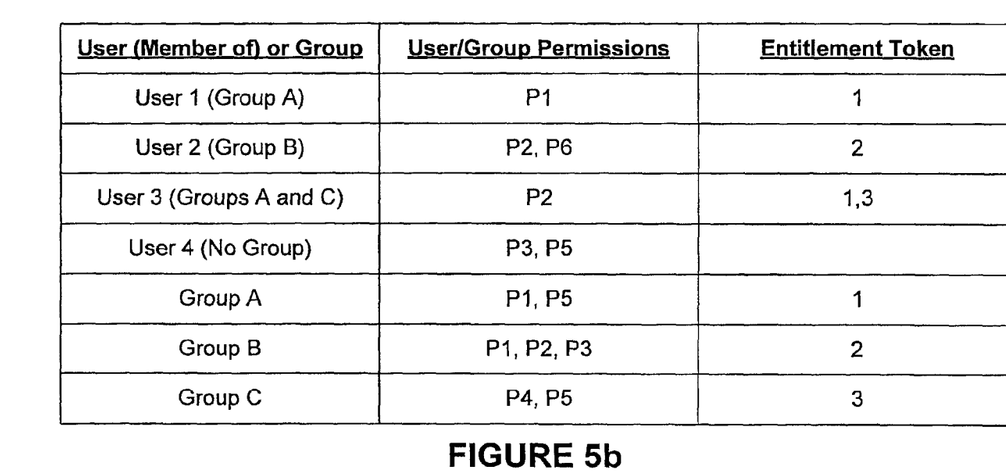
FIG. 5b is a table containing example user permissions in an illustrative data cache management system, in accordance with certain embodiments of the present invention.

When storing data, the data cache server 202 may also 'tag' the data with a cache signature and/or a list of permissionable entities (PEs) that allow the data cache server 202 to lookup the data at a later time for different users without querying the data server 204, as illustrated in S315. As illustrated below in FIGS. 5a and 5b, S315 may comprise storing one or more variables corresponding to the context of the data request (e.g., a cache signature) without regard to the user requesting the data, and one or more additional variables corresponding to the user permissions associated with the requested data (e.g, permissionable entities), at the data cache server 202. As shown in FIGS. 5a and 5b, the cache signature, PEs, and Entitlement Tokens may be stored in the same table, or may reference from a different table or may be otherwise linked to, the entitled data for which they are related. In certain examples, the cache signature may be based on the data request received from a user (e.g., type/range of data requested and other criteria), but need not be based on any individual or group permissions of the user requesting the data. For instance, the cache signature may be generated by hashing (HMAC-SHA1) the data request or part of the data request without any user data or user permissions. The data cache server 202 may generate several Entitlement Tokens from the same data and thus update multiple copies of the data stored on the data cache server 202 to allow rapid lookup of the cache when a user request accesses it.

In certain examples, for a specific data set delivered from the data server 204 to the data cache server 202, the delivered data set may contain the same data regardless of the permissions of the user requesting the data. However, the data sent to the user, for example, user 222 or user 224, may be limited depending on the requesting user's permissions. Thus, the data cache server 202 may determine and deliver all or part of an entitled data set to a requesting user depending on the user's permission level (i.e., entitlements), but may cache the entire data set for responding to future requests from the same user and/or different users. A user may have permissions that determine which portions of the data set (or the entire data set) the user will be permitted to access. For example, a user may have row level permissions, which allow the user to access certain rows of data within the data set. Another type of entitlement or permission may be selection level permissions, which determine a list of rows to be returned depending on the user's permissions. In selection level permissions, the data cache server 202 may request specific rows of data, but the data sent by the data server 204 would only be the rows corresponding to the user's selection level permissions. It should be noted that if the requested rows are not in the cache, then data containing the requested rows may also be returned in the request to the data cache server 202 and then cached on the data cache server 202. The newly cached data may or may not be sent to the user depending on whether the requesting user has permissions for the data. In certain examples, user permissions may be stored in binary format. For example, a user's permission may be set to "1" for a specific data row to indicate that the user has permissions to access the row, and "0" to indicate that the data cache server 202 should deny the user access to the row. By setting user permissions, the data cache server 202 is able to receive a single data set and deliver different subsets of the data to a plurality of users with different sets of user permissions. For example, a first user having a first set of user permissions may receive a first subset of data from the original data set and a second user having a second set of user permissions may receive a second subset of data from the original data set, without the data cache server 202 necessarily re-querying the data server 204.

The data sets sent to the data cache server 202 from the data server 204 may include corresponding data permissions for the user that initiated the data request and for other users on the system. Each data set may be associated with a plurality of allowable permissions. Thus, if a user has any of the allowable data permissions, such that the user's permissions intersect with the permissions of the data set, the user may be permitted to access (e.g., view, modify, delete, etc.) the subset of data which that user is entitled to access.

When a user request for data is received at the data cache server 202, as illustrated in S320, the user's request is calculated in S325 to identify a cache signature associated with the data request. In one example, this calculation is done by hashing the request that does not have user specific data. Then, in S330, the cache data server 202 is queried to determine if data matching cache signature has previously been cached. If the requested data exists on the data cache server 202 (e.g., if a matching cache signature is found), then in S335 the requesting user's permissions are checked to determine if there is an intersecting set of permissions for the cached data. If the permissions of the requesting user and the requested cached data intersect, such that there is at least one permission of the user that matches at least one permission of the cached data, a subset of the data may be sent to the user in S340. For example, referring to FIG. 5a, a data set may contain specific permissions (e.g., permissionable entities) such as row level permissions P1 and P2 for Data Row 1, permission P1 for Data Row 2, permission P2 for Data Row 3, and permission P4 for Data Row 4. In the example shown in FIG. 5b, User 1 has the associated user permission P1, User 2 has the associated user permissions P2 and P6, User 3 has the associated user permission P2, and User 4 has the associated user permissions P3 and P5. Therefore, in this example, the data cache server 202 may determine that User 1's permissions intersect with Data Row 1 and Data Row 2 (because User 1 has permission P1 and both Data Row 1 and Data Row 2 also have permission P1) and may send both Data Row 1 and Data Row 2 to User 1. Then, when processing a second request from User 4, the data cache server 202 may determine that User 4's permissions intersect only with Data Row 1 (because both User 4 and Data Row 4 have permission P3), and may send only Data Row 1 to User 4.

As illustrated in FIG. 5b, in addition to having a user permission, users may also be associated with one or more groups (e.g., user roles). In this example, User 1 and User 3 are members of Group A and User 2 is a member of Group B. Groups, like users, may also have associated data permissions. In this example, Group A has permissions P1 and P5, Group B has permissions P1, P2, and P3, and Group C has permissions P4 and P5. Each Group is given a unique Entitlement Token. In this example, Group A has an Entitlement Token of 1, Group B has an Entitlement Token of 2, and Group C has an Entitlement Token of 3. As a result, User 1 is assigned an Entitlement Token of 1 by virtue of belonging to group A, User 2 is assigned an Entitlement Token of 2 by virtue of belonging to group B, and User 3 is assigned an Entitlement Token of 1 and 3 by virtue of belonging to group A and C. In this example, User 4 is does not have an entitlement tag since User 4 is not a member of a group. The entitlement token corresponds to a grouping of permissions. Different Entitlement Tokens may include the same permission. In at least some examples, the number of Entitlement Tokens associated with a user may be less than the number of associated user permissions.

Figure 6:
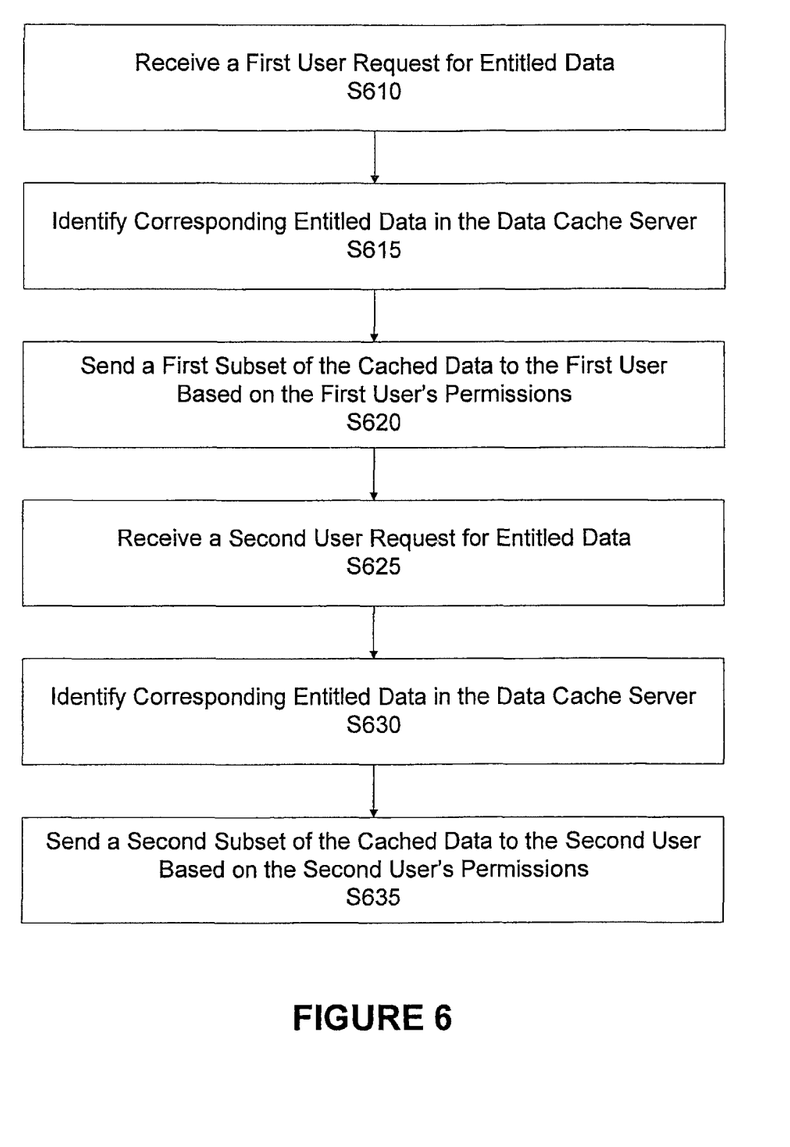
FIG. 6 is a flow diagram of an illustrative embodiment of entitled data cache management, in accordance with certain embodiments of the present invention.

Referring to FIG. 6, an illustrative flow diagram is shown in which different subsets of entitled data are delivered to different users having different permissions. In this example, in S610 a data cache server 202 receives a data request for entitled data from a first user. In S615, the data cache server 202 determines if the requested entitled data on the data cache server 202 has intersecting permissions with the first user's permissions. This may be done by first generating the cache signature from the request and may include the generation of an Entitlement Token. In S620, for the subset of data response having permissions that intersect with the first user's permissions, the data cache server 202 transmits the first subset to the first user. In S625, the data cache server 202 receives a similar data request (e.g., a data request requesting the same columns and rows of data and/or a query with the same query context) from a second user having different user permissions than the first user. In S630, the data cache server 202 may determine if the cached entitled data requested by the second user intersects with the permissions of the second user. In S635, if the second user's permissions intersect with permissions of the data that exists in the cache, then the data cache server 202 sends a second subset of the cached data. As discussed above, the second set of cached data sent to the second user may be different than the first subset of cached data sent to the first user in response to similar (or the same) data requests. Additionally, both the first subset of cached data and the second set of cached data may originate from a single set of cached data on the data cache server 202.

In certain embodiments, data stored on the data cache server 202 may also include an expiration date and/or time. In these examples, if the data cache server 202 receives a request for data and the data response has expired, the data cache server 202 might not send the cached data to the user, but instead may request updated data from the data server 204, and then send the updated data to the user. If the cached data has not expired, the data cache server 202 may send the cached data to the user. In other embodiments, the data cache server 202 may use other techniques to determine if the cached entitled data is stale (e.g. has changed), and requires an update.

Figure 4:
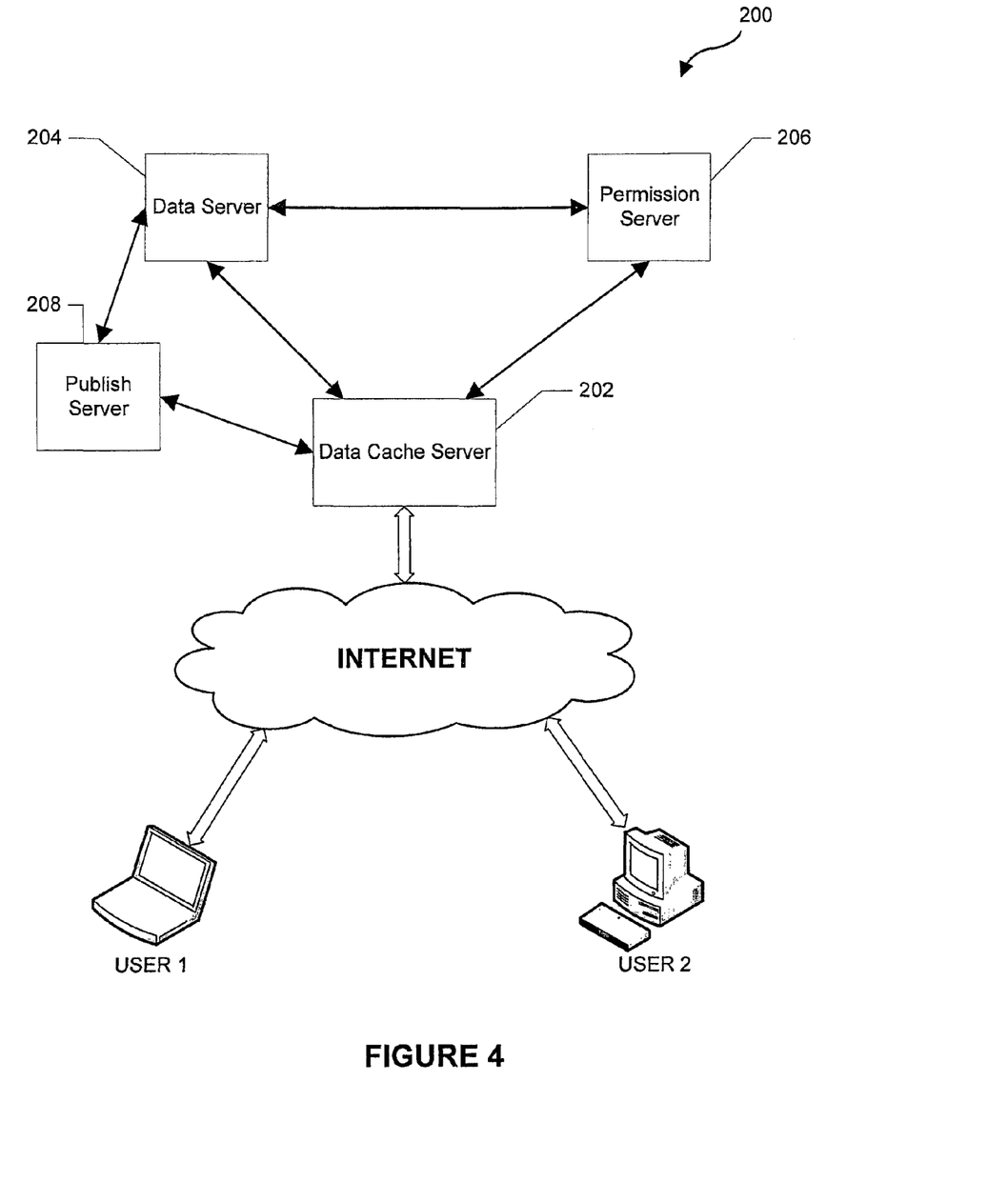
FIG. 4 is another component diagram for an illustrative data cache management system, in accordance with certain embodiments of the present invention.

Referring now to FIG. 4, the data server 204 may receive updated data. Upon the receipt of new data, the data server 204, may use a publish server 208 to notify the data cache server 202 of the updated data. In order to provide updated data to the data cache server 202 in a timely manner, the publish server 208 will notify the data cache server 202 that new data has arrived using a DataID corresponding to the data. The DataID represents a hierarchy of related cached data within the data cache server 202. Upon receipt of this notification, the data cache server 202 sends a request to the data server 204 for updated data. The data server 204 actively updates the data cache server 202 when the data server 204 receives new data via a publish server 208.

Referring to FIG. 5a, line 1 shows the DataID Fund.Est.Cons.group1.IBM. This DataID, which includes the domains: Funds, Est, Cons, Group1, and IBM, can be considered a hierarchy with the root starting at Fund and a leaf ending at IBM. The data server 204 can notify the data cache server 202 of changed data by sending any portion of the DataID delimited by ".". For example, sending a notification DataID of Fund.Est would cause the data cache server to retrieve data for Fund.Est.Cons.Group1.IBM., Fund.Est.Cons.Group1.INTC. Fund.Est.Det.Group2.IBM and Fund.Est.Det.Group2.INTC. As another example, sending a notification of DataID of Fund.Est.Cons would cause the data cache server retrieve data for Fund.Est.Cons.Group1.IBM., and Fund.Est.Cons.Group1.INTC. The DataID allows a large number of different data caches to be updated with a small number of notifications.

Figure 7:
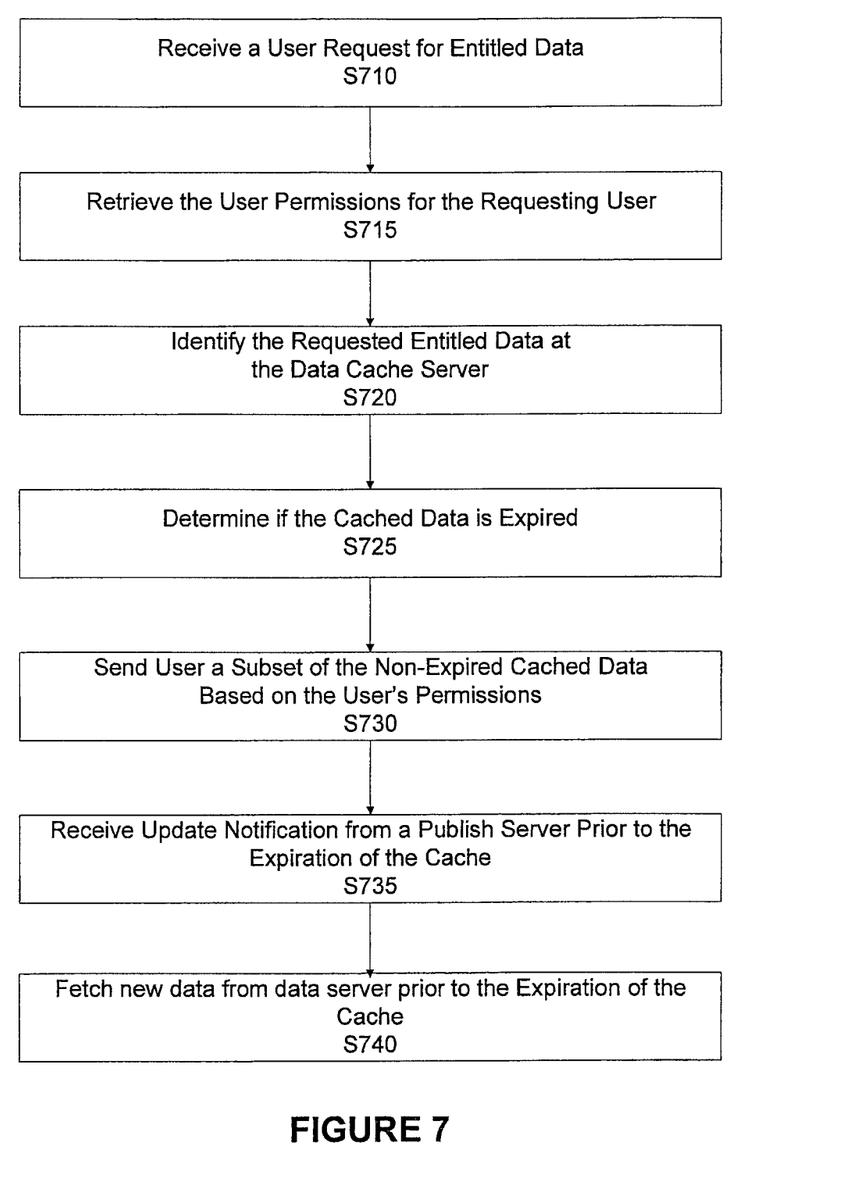
FIG. 7 is flow diagram of another illustrative embodiment entitled data cache management, in accordance with certain embodiments of the present invention.

In certain embodiments the data cache server will send a notification to users (e.g., User 1 and User2) that the DataID has changed. User1 and User2 may have their own caching systems and may wish to have timely notification of the data changes. Referring to FIG. 7, an illustrative flow diagram is shown describing a technique for updating a data cache. In S710, the data cache server 202 receives a user request for entitled data that may be cached at the data cache server 202. In S715, the data cache server 202 retrieves the requesting user's permissions, for example, by identifying the requesting user and sending a permission query to the permission server 206 to retrieve the permissions, Groups, and Entitlement Tokens associated with the user. In S720, the data cache server 202 determines if the requested data stored within the data cache has permissions that intersect the retrieved user permissions. If the data is stored in the cache, the data cache server 202 confirms that the cached data is not expired, as shown in S725. If the requested cached data has not expired, the data cache server 202 may send a subset of the cached data, based on the user's permissions, to the user in S730. In S735, the data cache server 202 receives asynchronous notifications from a publish server 208. It should be understood that receiving data notifications from the publish server 208 need not occur only after responding to a user request. That is, receiving updated data notifications in S735 may occur one or more times before, during, or after responding to user requests as shown in FIG. 7. In certain examples, the data server 204 and/or publish server 208 may determine the events or schedule by which updated data is transmitted to the data cache server 204, without knowing when the data cache server 202 may be responding to user requests. Therefore, the data cache server 202 may be configured to concurrently respond to user requests for cached data, while receiving and processing data notifications and thus receiving new data from the publish server 208 and/or data server 204.

In certain examples, the publish server 208 may utilize the same (or similar) software as the data server 204 to facilitate communication between the publish server 208 and the data server 204. For instance, the publish server 208 may utilize web services to manage the subscriptions. In certain embodiments, a remote user, such as user 222, can subscribe to the publish server 208 to receive asynchronous updates. In this embodiment, publish server 208 may post data on a website using XML via HTTP to update the remote user. The publish server 208 may also include a registration table in order to register and de-register remote users. In one embodiment, the publish server 208 may supply a remote user with a URL to notify the remote user of new data published on the web service.

The publish server 208 may also include a publish/subscribe table for managing the updates to the data cache server 202. In this embodiment, the data cache server 202 is added to the subscriber table and the data is added to a publish/subscribe table. As the data changes, the data server 204 notifies the publish server 208 that an entry has been made in the publish/subscribe table. If the data cache server 202 is located in the publish/subscribe table with the same signature, the cache may be updated at the data cache server 202.

In certain examples, the publish server 208 may also include a notification system. In at least one embodiment, the notification system may be physically located within the publish server 208. When a user 222 or the data cache server 202 subscribes to the publish server 208 for updated data, the notification system may place an entry in the form of a request for updated data into an update notification queue. This queue may contain all data required to update a subscribed user, such as the data cache server 202 or user 222. Upon placing a request into the queue, the entire queue may be checked for previous requests for the same data. If a previous request exists, that queue entry is updated rather than a creating a new entry. The queue may be implemented as a FIFO queue (First In First Out). The notification software may send a notification to the subscriber that the data has updated and delete the corresponding queue entry. The notification system may also manage the number of notifications of updated data generated by the data server 204. The notification system may determine if a previous notification and a later notification both exist and delete one of the notifications because that notification is no longer relevant. The queue management can prevent duplicate notifications from occurring within a threshold frequency. For example, the queue management system may not allow a duplicate notification to occur within a predetermined time window (e.g. 1 minute). By preventing duplicate notifications from occurring, number of requests to the data server 204 may be reduced.

In certain examples, upon receiving a notification of changed cached data from the publish server 208, the data cache server 202 may make a determination to invalidate (e.g., mark as stale) the portion of the data cache containing the old data, and/or request the updated data (e.g., asynchronously request) updated data for any known stale data from the publish server 208 or the data server 204. When the data cache server 202 receives a request from a user 222 for data that is known to be stale, one of two responses may be given. Depending on the timing of the new data updates and/or the user permissions of the requesting user, the data cache server 202 may send an older version of the requested data to the user, or may delay the delivery of the requested data to the user until the updated data has been received by the data cache server 202. For example, the software application at the data cache server 202 handling the user request may determine whether the user should be provided the updated data or whether the user should be satisfied with the older data.

As mentioned above, when the data cache server 202 determines that some of the cached data is (or might be) stale, it may request updated data from the data server 204. If the data server 204 is unable to provide updated data to the data cache server 202, the update request from the data cache server 202 may remain in the queue until the data server 204 is able to process the request and send the updated data. In certain examples, if the data server 204 is unable to update the cache, the system may send an alert to an administrator or monitoring facility for the data provider.

In at least one embodiment, a queue notification may contain incremental sequence numbers, so that a plurality of data caches may be allowed to query each other for the latest sequence number. For example, a cache may broadcast its sequence number for a specific permission, and the additional caches on the data cache server 202 may all respond and broadcast their sequence number corresponding to the specific permission. In this example, if a cache has a sequence number greater than another cache, the cache having the larger sequence number may mark their data as expired and then may requests updated data from the data server 204. In at least one embodiment, if the cache receives a notification from the notification service, the cache updates and stores a new sequence number.

In at least one embodiment, the data cache server 202 may use a distributed cache. In this case a single server may be considered the master and manage notifications and updating of the cache which is distributed among all data cache servers (or group of servers). Upon a failure event of a master data cache server, another master server is selected from the group of servers.

As mentioned above, the data sent to a user responsive to a user request may depend on the user's permissions. Additionally, in other embodiments, the response data sent to a user may be further restricted or segmented depending on other characteristics of the user. For example, a user may only receive additional data (or less data) based on the user's geographic region. In another embodiment, depending on the type of account the user has with the financial provider, the user may only see a select amount or type of data. Basing the response provided to the user from the data cache server 202 on these additional characteristics may be referred to as segmentation. To utilize this type of segmentation, a common set of codes may be associated with a plurality of data sets to define permissions on those data sets. The permissions defined by the common set of codes may result in a user not being able to see data outside of the user's current regions or country, or may restrict data from users based on other characteristics. Referring to FIG. 6, an illustrative flow diagram is shown in which different subsets of entitled data are delivered to different users having different permissions. Referring to FIG. 7, an illustrative flow diagram is shown describing a technique for updating a data cache. Typically the users would be assigned an Entitlement Token to manage permissions in this manner. The Entitlement Token allows for a large amount of permissions to be grouped into a smaller number of sets as described above.

Figure 8:
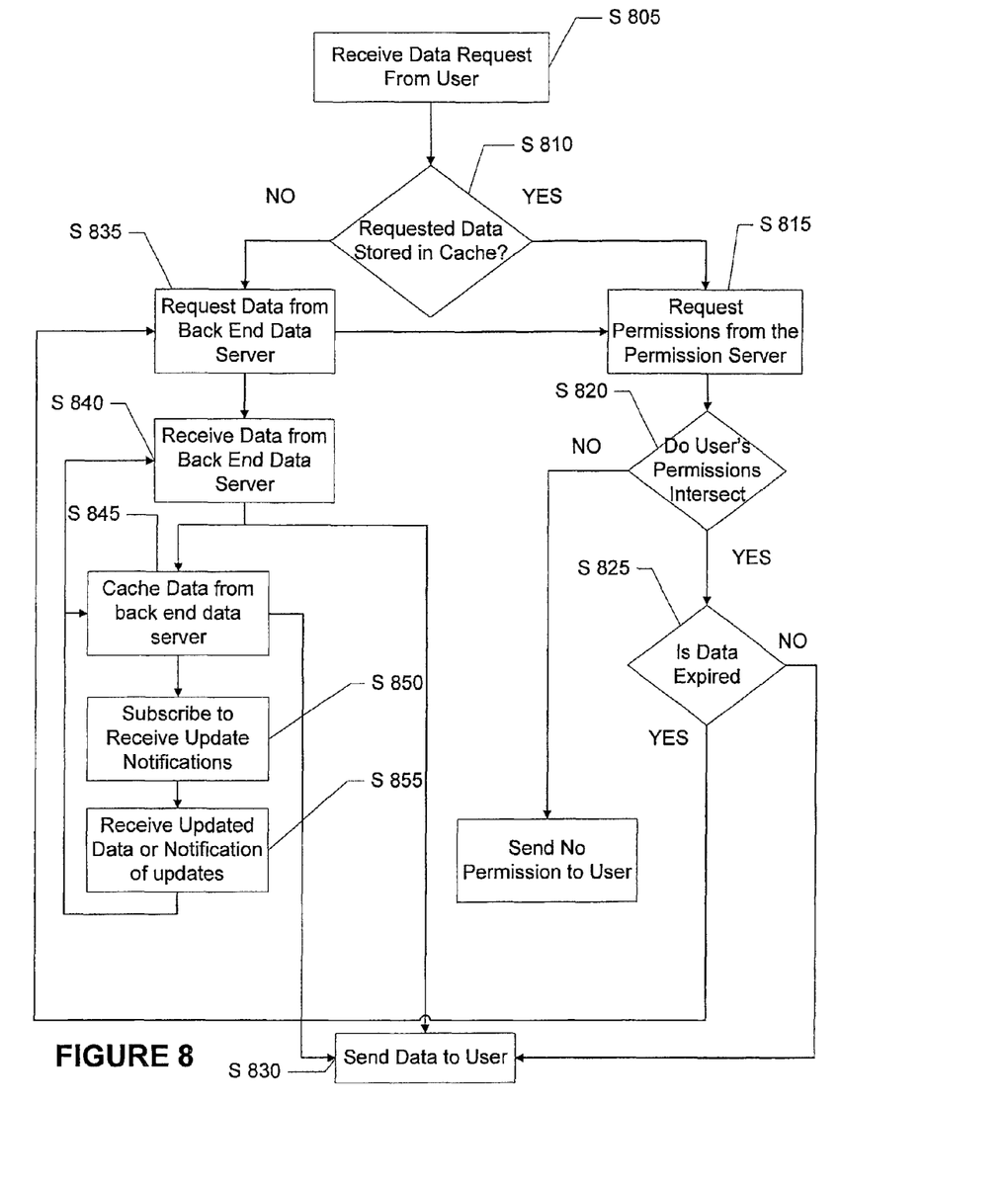
FIG. 8 is flow diagram of another illustrative embodiment of entitled data cache management, in accordance with certain embodiments of the present invention.

Referring to FIG. 8, a flow diagram is shown illustrating some of above aspects for providing cached entitled data to users. As shown in S805, the data cache server 202 receives a request for entitled data from a user, such as user 222. In S810, the data cache server 202 may first hash the request and may then determine if the data exists in the local cache storage. If the requested data is present in the local cache (S810: Yes), the data cache server 202 may then retrieve the requesting user's permissions from the permission server 206 in S815, and then determine if the user's permissions intersect (e.g., have a matching or corresponding permission) with the cached data permissions in S820. The users Entitlement Tokens may allow the group permissions to be represented as a smaller number of buckets. If the user's permissions intersect with the data permissions or there exists an Entitlement Token combined with the cache signature (S820: Yes), the data cache server 202 may then determine if the cached data has expired in S825. If the cached data is not expired (S825: No), the data cache server 202 may then send the data to the user, as shown in S830. If the user's permissions do not intersect with the data permissions (S820: No), the data cache server 202 responds to the user that the user does not have permission to view the data.

In this example, if the cached data has expired (S825: Yes), then in S835 the data cache server 202 may request updated data from the data server 204. In S840, the data server 204 sends the requested updated data to the data cache server 202. Then, in S845, the data cache server 202 receives the updated data and caches the data locally, before sending the updated data to the requesting user in S830.

Returning to step S810, if the data cache server 202 determines that the data matching the user's request does not exist in the cache (S810: No), the data cache server 202 may request the data from the data server 204 in S835. In certain examples, the data cache server 202 may also request the user's permissions or Entitlement Tokens in S815 simultaneously, in order to potentially operate more efficiently. In S845, the data cache server 202 receives the updated data and caches the data locally, and may then send the updated data to the user in S830.

As described above, the data cache server 202 may also subscribe to one or more publish servers 208 to receive updates to the cache as the data changes, as shown in S850. When the data cache server 202 subscribes to the publish server 208, the publish server 208 sends either updated data or a notification that the data has changed to the data cache server 202, as illustrated in S855. In certain examples, asynchronous processes running at the publish server 208 and/or data cache server 202 may be scheduled periodically and/or event driven in order to effectively keep the entitled data cache on the data cache server 202 up to date. FIG. 8 indicates a dashed line between S850 and S855 to show the temporal nature of subscribing to the publish server 208 and the time the data arrives at the data cache server 202 asynchronously due to a change.

It is to be understood that the invention is not limited in its application to the details of construction and the arrangement of the components and method steps set forth herein. The invention is capable of other embodiments and of being practiced or being carried out in various ways. Variations and modifications of the foregoing are within the scope of the present invention. For example, one of ordinary skill in the art will appreciate that the steps illustrated in the illustrative figures may be performed in other than the recited order, may be repeated, and that one or more steps illustrated may be optional in accordance with aspects of the disclosure. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. An apparatus, comprising:
   one or more processors; and
   memory storing executable instructions that, when executed by the one or more processors, cause the apparatus to:
   receive entitled data from a data server, wherein the entitled data has been assigned a plurality of data permissions that represent one or more permissions a requesting user must be assigned in order to access at least a portion of the entitled data;
   store entitled data and cache signature corresponding to the entitled data;
   receive a first data request for the entitled data from a first user;
   identify the cache signature based on a hashing of the first data request;
   retrieve user permissions corresponding to the first user;
   identify a first user permission intersection between the user permissions corresponding to the first user and the data permissions;
   retrieve, using the cache signature, a first set of the entitled data in accordance with the first user permissions intersection;
   transmit the first set of the entitled data as a response to the first data request for the entitled data;
   receive a second data request for the entitled data from a second user;
   identify the cache signature based on a hashing of the second data request;
   retrieve user permissions corresponding to the second user;
   identify a second user permission intersection between the user permissions corresponding to the second user and the data permissions;
   retrieve, using the cache signature, a second set of the entitled data in accordance with the second user permission intersection; and
   transmit the second set of the entitled data as a response to the second data request for the entitled data.

2. The apparatus of claim 1, wherein the memory further stores executable instructions that, when executed by the one or more processors, cause the apparatus to:
   determine whether the entitled data is expired prior to responding to the first data request for the entitled data; and
   determine whether the entitled data is expired prior to responding to the second data request for the entitled data.

3. The apparatus of claim 1, wherein the memory further stores executable instructions that, when executed by the one or more processors, cause the apparatus to:
   subscribe to an update service that provides notifications to computing device when the entitled data needs to be updated.

4. The apparatus of claim 2, wherein the memory further stores executable instructions that, when executed by the one or more processors, cause the apparatus to:
   receive an update to the entitled data prior to expiration of the entitled data.

5. The apparatus of claim 1, wherein the memory further stores executable instructions that, when executed by the one or more processors, cause the apparatus to:
   receive a third data request for the entitled data from the first user; and
   transmit a third set of the entitled data as a response to the third data request for the entitled data, wherein the third set of the entitled data is different from the first set of the entitled data in accordance with a change in the user permissions corresponding to the first user.

6. The apparatus of claim 1, wherein the memory further stores executable instructions that, when executed by the one or more processors, cause the apparatus to:
   receive an update notification that includes an identification of one or more data domains that need to be updated, wherein the entitled data is assigned to at least one of the one or more data domains; and
   request an update to the entitled data responsive to the update notification.

7. A method comprising:
   receiving, by a computing device, entitled data from a data server, wherein the entitled data has been assigned data permissions that represent one or more permissions a requesting user must be assigned in order to access at least a portion of the entitled data;
   store the entitled data and a cache signature corresponding to the entitled data;
   receiving a first data request for the entitled data from a first user;
   identifying the cache signature based on a hashing of the first data request;
   retrieving user permissions corresponding to the first user;
   identifying a first user permission intersection between the user permissions corresponding to the first user and the data permissions;
   retrieving, using the cache signature, a first set of the entitled data in accordance with the first user permission intersection;
   transmitting the first set of the entitled data as a response to the first data request for the entitled data;
   receiving a second data request for the entitled data from a second user;
   identifying the cache signature based on a hashing of the second data request;
   retrieving user permissions corresponding to the second user;

identifying a second user permission intersection between the user permissions corresponding to the second user and the data permissions;

retrieving, using the cache signature, a second set of the entitled data in accordance with the second user permission intersection; and transmitting the second set of the entitled data as a response to the second data request for the entitled data.

8. The method of claim 7, further comprising:

determining whether the entitled data is expired prior to responding to the first data request for the entitled data; and determine whether the entitled data is expired prior to responding to the second data request for the entitled data.

9. The method of claim 7, further comprising:

subscribing to service that provides update notifications;

receiving asynchronous update notifications for the entitled data; and updating the entitled data responsive to the update notification.

10. The method of claim 7, wherein the hashing of the first data request results in the cache signature.

11. The method of claim 7, further comprising:

requesting and receiving the user permissions from a permission server.

12. The method of claim 7, further comprising:

receiving a third data request for the entitled data from the first user, determining the user permissions corresponding to the first user have changed subsequent to receiving the first data request; and transmitting a third set of the entitled data as a response to the third data request for the entitled data, wherein the third set of the entitled data is different from the first set of the entitled data.

13. The method of claim 7, further comprising:

storing, with the entitled data, an entitlement token corresponding to the data permissions.

14. The method of claim 13, wherein the entitlement token corresponds to the data permissions and is assigned to a grouping of users, wherein each user in the grouping of users is allowed access to data subject to the data permissions.

15. The method of claim 7, further comprising:

receiving a single notification that notifies the computing device of an update to multiple data domains arranged in a hierarchy, wherein the entitled data is assigned to at least one of the multiple data domains.

16. The method of claim 7, further comprising:

receiving an update notification that includes an identification of one or more data domains that need to be updated, wherein the entitled data is assigned to at least one of the one or more data domains; and requesting an update to the entitled data responsive to the update notification.

17. One or more non-transitory computer-readable media storing executable instructions configured to, when executed, cause an apparatus to:

receive entitled data from a data server, wherein the entitled data has been assigned data permissions that represent one or more permissions a requesting user must be assigned in order to access at least a portion of the entitled data;

store entitled data and a cache signature corresponding to the entitled data;

receive a first data request for the entitled data from a first user;

identify the cache signature based on a hashing of the first data request;

receive user permissions corresponding to the first user;

identify a first user permission intersection between the user permissions corresponding to the first user and the data permissions;

retrieve, using the cache signature, a first set of the entitled data in accordance with the first user permission intersection;

transmit the first set of the entitled data as a response to the first data request for the entitled data;

receive a second data request for the entitled data from a second user;

identify the cache signature based on a hashing of the second data request;

retrieve user permissions corresponding to the second user;

identify a second user permission intersection between the user permissions corresponding to the second user and the data permissions;

retrieve, using the cache signature, a second set of the entitled data in accordance with the second user permission intersection; and transmit the second set of the entitled data as a response to the second data request for the entitled data.

18. The one or more non-transitory computer-readable media of claim 17, further storing executable instructions that, when executed, cause the apparatus to:

receive an update notification that includes an identification of one or more data domains that need to be updated, wherein the entitled data is assigned to at least one of the one or more data domains; and request an update to the entitled data responsive to the update notification.

19. A method, comprising:

receiving entitled data from a data server, wherein the entitled data has been assigned data permissions that represent one or more permissions a requesting user must be assigned in order to access at least a portion of the entitled data;

storing the entitled data and cache signature that corresponds to the entitled data;

receiving a plurality of requests for the entitled data;

processing each of the plurality of requests by at least hashing each of the plurality of requests, wherein each processing results in the cache signature; and responding to each of the plurality of requests with a transmission of a different data set, resulting in the transmission of a plurality of data sets, wherein each of the plurality of data sets is different from other data sets in the plurality of data sets, and each data set being in accordance with an intersection of user permissions and the data permissions.

20. The method of claim 19, further comprising:

receiving an update notification that includes an identification of one or more data domains that need to be updated, wherein the entitled data is assigned to at least one of the one or more data domains; and requesting an update to the entitled data responsive to the update notification.

* * * * *